United States Patent
Crain (10) Patent No.: US 9,403,640 B1
(45) Date of Patent: Aug. 2, 2016

(54) PORTABLE LINED ACID STORAGE TANK

(71) Applicant: Scott Crain, Durant, OK (US)

(72) Inventor: Scott Crain, Durant, OK (US)

(*) Notice: Subject to any disclaimer, the term of this patent is extended or adjusted under 35 U.S.C. 154(b) by 0 days.

(21) Appl. No.: 14/756,808

(22) Filed: Oct. 17, 2015

(51) Int. Cl.
| | |
|---|---|
| *B60P 3/22* | (2006.01) |
| *B65D 90/04* | (2006.01) |
| *B65D 88/12* | (2006.01) |
| *B65D 88/54* | (2006.01) |
| *B65D 90/10* | (2006.01) |
| *B65D 90/20* | (2006.01) |

(52) U.S. Cl.
CPC ............. *B65D 90/048* (2013.01); *B60P 3/2225* (2013.01); *B65D 88/128* (2013.01); *B65D 88/54* (2013.01); *B65D 90/10* (2013.01); *B65D 90/20* (2013.01)

(58) Field of Classification Search
CPC .... B65D 90/048; B65D 88/128; B65D 88/54; B65D 90/10; B65D 90/20; B60P 3/225
See application file for complete search history.

(56) References Cited

U.S. PATENT DOCUMENTS

| | | | |
|---|---|---|---|
| 2,836,963 A | 6/1958 | Fox | |
| 4,161,263 A * | 7/1979 | Wagner | B60P 3/426 105/360 |
| 4,163,505 A | 8/1979 | Gunther | |
| 4,796,676 A | 1/1989 | Hendershot | |
| 5,148,939 A | 9/1992 | Roser | |
| 6,645,191 B1 | 11/2003 | Knerr | |
| 8,746,478 B2 | 6/2014 | Claeys | |
| 8,763,855 B1 | 7/2014 | Harvey | |
| 9,028,147 B2 | 5/2015 | Schmal | |
| 2003/0047561 A1 * | 3/2003 | Neto | B65D 90/046 220/1.6 |
| 2005/0023278 A1 * | 2/2005 | Yong | B65D 90/046 220/1.6 |
| 2012/0132650 A1 * | 5/2012 | Buonerba | B60P 3/426 220/1.6 |
| 2014/0097182 A1 * | 4/2014 | Sheesley | B65D 88/62 220/1.6 |
| 2014/0367953 A1 * | 12/2014 | Vaughn | B65D 88/54 280/830 |
| 2015/0122844 A1 | 5/2015 | Klein | |

* cited by examiner

Primary Examiner — Anne Marie Boehler
Assistant Examiner — Marlon A Arce
(74) Attorney, Agent, or Firm — Randal D. Homburg

(57) ABSTRACT

A storage tank containing a suspended liner for the supply and storage of a full strength corrosive liquid such as a strong acid or base, the liner suspended within the storage tank from several locations by upper suspension straps from above held in place by corrosive resistant rods through rod suspension supports from the ceiling of the storage tank, and by a plurality of tie clips integrated within the suspended liner attaching to a plurality of suspension hooks placed within the interior of the storage tank to fully deploy the suspended liner to fill and to dispense the corrosive liquid within the suspended liner from the storage tank.

19 Claims, 9 Drawing Sheets

PORTABLE LINED ACID STORAGE TANK

CROSS REFERENCE TO RELATED APPLICATIONS

None.

I. BACKGROUND OF THE INVENTION

1. Field of Invention

A storage tank containing a suspended liner for the supply and storage of a full strength corrosive liquid such as a strong acid or base, the liner suspended within the storage tank from several locations by upper suspension straps from above held in place by corrosive resistant rods through rod suspension supports from the ceiling of the storage tank, and by a plurality of tie clips integrated within the suspended liner attaching to a plurality of suspension hooks placed within the interior of the storage tank to fully deploy the suspended liner to fill and to dispense the corrosive liquid within the suspended liner from the storage tank.

2. Description of Prior Art

A preliminary review of prior art patents was conducted by the applicant which reveal prior art patents in a similar field or having similar use. However, the prior art inventions do not disclose the same or similar elements as the present storage tank and suspended liner, nor do they present the material components in a manner contemplated or anticipated in the prior art.

Having a liner placed within another vessel is not a new concept, as indicated by prior art. The novelty of the present storage tank and liner appears from the liner being resistant to a strong corrosive liquid and having the liner suspended from within the storage tank using the disclosed assembly of elements, along with other novel and unanticipated combination of elements within the specification and claims herein.

For example, a flexible liner or bag is contained within a vessel as disclosed in U.S. Pat. No. 2,836,963 to Fox, which provides the flexible liner at a low temperature. In this disclosure, the liner is connected at the neck of the vessel and is free to expand within the interior of the vessel, similar to an accordion, containing liquid oxygen for a rocket propellant tank. The bag is described as a polymer of butadiene and styrene, which in 1958, were relatively new polymers. The physical characteristics of the bag by function were disclosed using a recipe and chemical general class. A vertically suspended liner is disclosed in U.S. Pat. No. 4,163,505 to Gunther which suspends a liner from an inner top of a cylindrical vessel. A lower floor and frame floats in a vertical direction within the vessel, the lower floor assuming the configuration of the interior of the vessel. A vertical liner attaches between the inner top and the lower floor with cables stretched from top to bottom in the vessel having lateral supports that rise and fall along the cables, these lateral supports attached to the liner sides and fold locations. It is further disclosed that the floor rises and falls with due to a liquid filler within the vessel forcing the floor upwards, or, when drained, allows the floor to be lowered, the liquid providing the means to induce the vertical movement of the bottom of the liner. Bags are similarly suspended from an inner top of a vessel in U.S. Pat. No. 9,028,147 to Schmal, disclosing a trash can liner with an upper elastic band. In U.S. Patent Publication No. 2015/0122844 to Klein, showing a liquid containing bag suspended within a vessel having a lower drain tube leading from the liner through a port in the vessel for draining a liquid contained in the liner from the vessel through the drain tub, the bag filled from above.

A portable liquid storage tank is disclosed in U.S. Pat. No. 8,746,478 to Claeys, which provides an expandable frame which supports a liquid containing liner at an upper margin of grommets which are tied to the upper portion of the expandable frame. The liner is a PVC vinyl, but any material impervious to liquid to be stored can be used. A drain tube leading from a drain is included and several hand grips are placed in the bottom of the liner for workers to expand the liner prior to the introduction of a liquid. The grips are provided also to elevate the bottom of the liner to direct the liquid towards the drain as the liner is emptied, something contrary to an indication that a full strength corrosive is an ideal liquid stored within the liner and frame. A vessel fitted liner is disclosed in U.S. Pat. No. 4,796,676 which is actually attached by an adhesive to the interior of a vessel, the liner not expandable.

II. SUMMARY OF THE INVENTION

Strong acids, particularly hydrochloric acids, are highly corrosive strong mineral liquids with many industrial uses. Hydrochloric acid appears as a manufactured commercial product and naturally occurring in the stomach as gastric acid. Hydrochloric acid (HCl) is used in the chemical reagent in the large-scale production of vinyl chloride for PVC plastic and polyurethane, two very well used plastic for construction and liquid containment. It is also used in household cleaning products, metal refinement, water treatment, production of food products, descaling, fabric and leather production and in the oil and gas industry for acid fracking, or the removal of calcium containing debris, like limestone, from the well for other fracking products to enter the fissures and cracks in the substrata. The preferred concentration of HCl in the oilfield is 15% HCl in water, but can be as high as 28% or as low as 3%, according to those skilled in the oilfield industry. Hydrochloric acid, commercially, is sold at strengths up to 38% (known in the industry as concentrated grade), although fuming HCl can be found as high as 40%. The 40% strength is seldom useful as its evaporation rate is so high, containment is difficult if not impossible, to accomplish.

It is the objective and purpose of the present portable storage tank and suspended liner to store concentrated grade HCl at a remote location to maximize the quantity of HCl or other strong acid with the minimal spatial profile as possible. By way of practical use, a vessel containing 3000 gallons of full strength HCl would occupy less total storage space than a vessel containing more than 3000 gallons of a lesser strength HCl, reducing the environmental footprint of the acid storage container at the location, most commonly applied to an oilfield drilling site where acid fracking occurs. The present storage tank and suspended liner provide for the storage and dispensing of the full strength or concentrated grade HCl with the acid safely contained during available use. It is contemplated within the scope of the storage tank and suspended liner that it may be used with other acids or strong corrosive liquids such as liquid NaOH, a strong base, in addition to the HCl.

III. DESCRIPTION OF THE DRAWINGS

The following drawings are submitted with this utility patent application.

FIG. 8 is a cross sectional view of the portable storage tank along section lines 8/8 of FIG. 4, with phantom lines indicating the internal corrosive resistant liner to demonstrate the preferred placement of the upper rod suspension means throughout the internal cavity of the portable storage tank.

FIG. 9 is a cross sectional view of the portable storage tank along section lines 8/8 of FIG. 4, with phantom lines indicating the internal corrosive resistant liner to demonstrate the preferred placement of the upper and lower eyeloops throughout the internal cavity of the portable storage tank.

IV. DESCRIPTION OF THE PREFERRED EMBODIMENT

A portable storage tank 10 for the containment and dispensing of a strong corrosive at a remote location suspending an internal corrosive resistant liner 200, shown in FIGS. 1-16 of the drawings, comprising the storage tank forming a general rectangular configuration and having an internal cavity 100 having a capacity to contain several hundred gallons of a corrosive liquid and the internal corrosive resistant liner 200 having a liquid capacity less than the capacity of the internal cavity 100 of the portable storage tank 10, the liner 200 conforming to and removably suspended within the internal cavity 100. The corrosive liquid contained within the portable storage tank 10 and liner 200 may be a strong acid, strong base or oxidizer for controlled, on-site dispensing of the corrosive liquid for use in the manufacturing of household cleaning products, metal refinement, water treatment, production of food products, descaling, fabric and leather production and in the oil and gas industry for acid fracking, or the removal of calcium containing debris, like limestone, from the well for other fracking products to enter the fissures and cracks in the substrata when the corrosive liquid is hydrochloric acid (HCl). It is the intention of the portable storage tank 10 and internally suspended corrosive resistant liner 200 to be capable of containing and dispensing these strong corrosive liquids at full strength concentrations. It is also the intent of the portable storage tank 10 and internally suspended corrosive resistant liner 200 to be reusable and filled at a remote location for subsequent deliver to a remote location by roadway or by rail.

The portable storage tank 10 further comprises a floor section 20 defining a floor surface 22 and supported by a floor frame 24, a roof section 30 defining an interior ceiling 32, two vertical side sections 70 defining interior walls 72, a vertical front section 80 defining an interior wall 82, a vertical rear section 90 defining an interior wall 92, a towing hitch 84 attached to the floor frame 24 at the front section 80 and wheels 26 below the floor frame 24, providing the portable storage tank 10 with the capacity for transportation on a roadway, FIGS. 1-7, with the towing hitch 84 attached to a towing vehicle, not shown. The preferred shape of the portable storage tank 10 would be an overall rectangular box, as shown in FIGS. 1-9, with the floor section 20, interior ceiling 32, two vertical interior walls 72, and the interior walls 82, 92, of the front and rear sections 80, 90, define the internal cavity 100 within the portable storage tank 10. While the preferred shape is shown and disclosed as the overall rectangular box, it is contemplated that any shape could be used, although the shape should be confined to a symmetrical shape so that suspension forces applied by the internal corrosive resistant liner 200 suspended within the portable storage tank 10 would be uniformly distributed and balanced, especially when the internal corrosive resistant liner 200 is at a full capacity.

Figure 7:
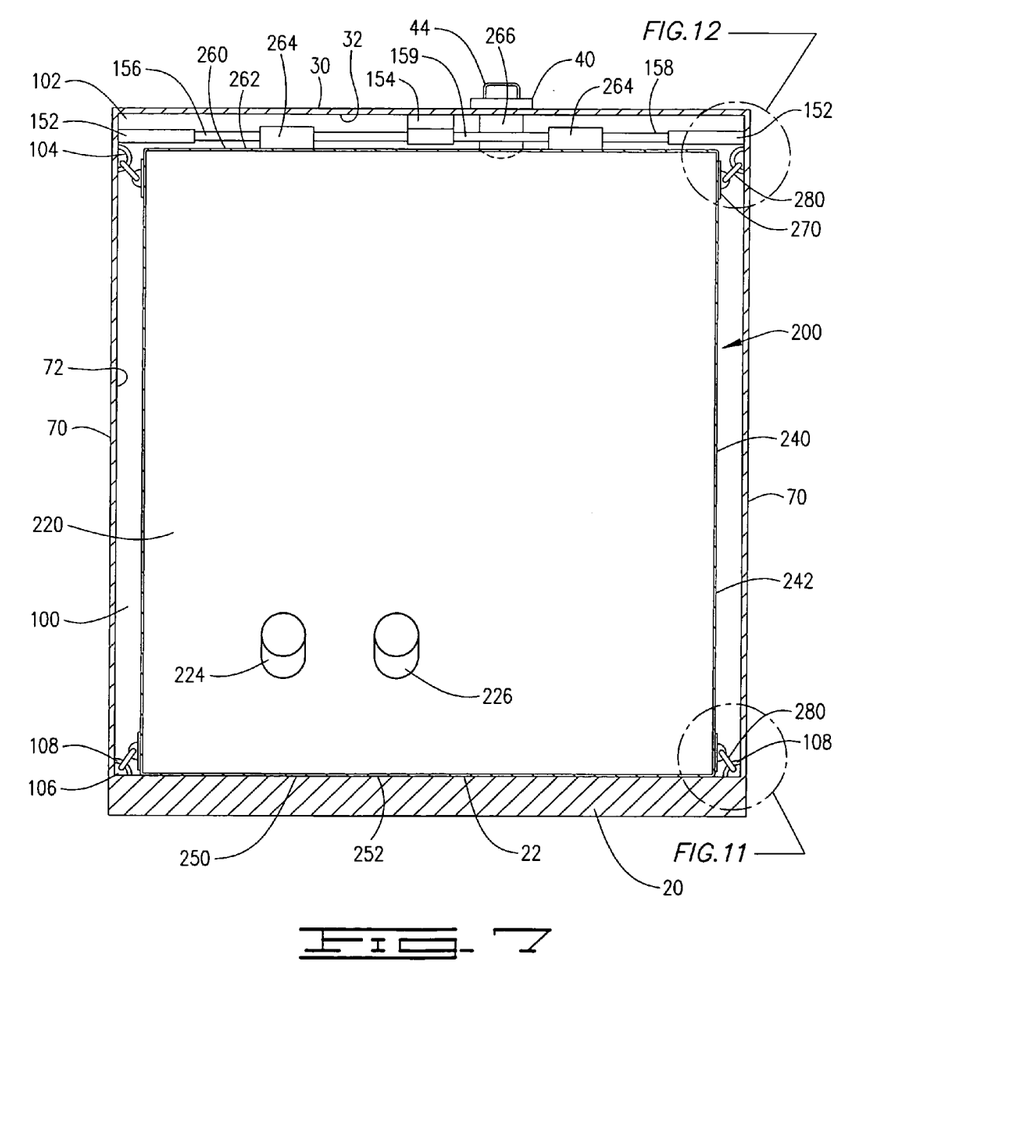
FIG. 7 is a cross sectional view of the portable storage tank and the internal corrosive resistant liner along section lines 7/7 of FIG. 3.
Figure 10:
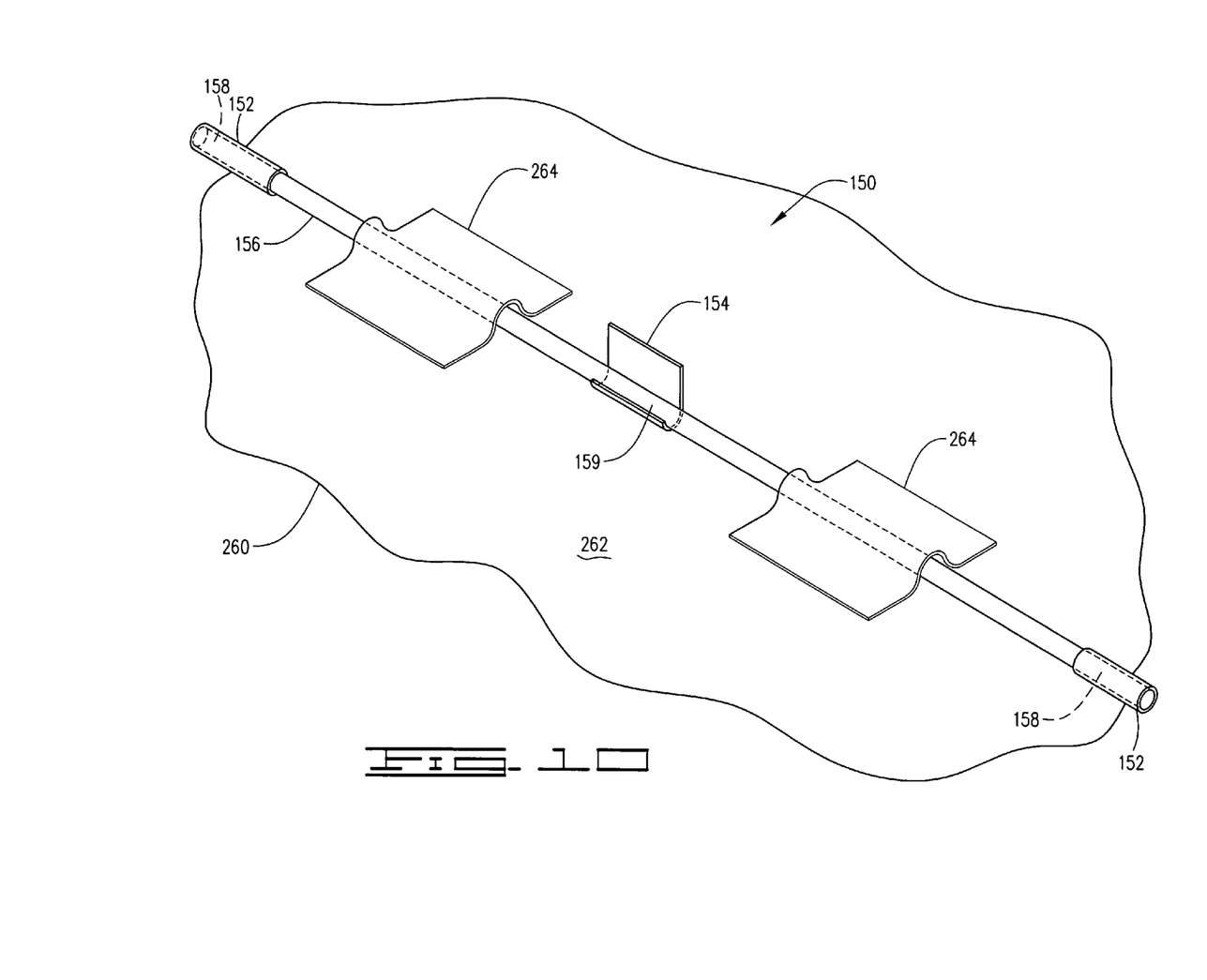
FIG. 10 is a perspective view on an embodiment of the upper rod suspension means in relation to the upper suspension panels on the exterior surface of the roof panel.

A cross sectional view of the internal cavity 100 of the portable storage tank 10, FIG. 7, further defines upper corners 102 formed at an upper intersection 103 of the vertical side section interior walls 72 and the interior ceiling 32 and lower corners 106 formed at the lower intersection 107 of the vertical side section interior walls 72 and the floor surface 22. At the upper corners 102, upper eye loops 104 are attached along the entire length upper intersection 103, as shown in FIG. FIGS. 7 and 12, and at the lower corners 106, lower eye loops 108 are attached along the entire length lower intersection 107, also shown in FIGS. 7 and 11. These upper and lower eye loops 104, 108, define a plurality of corner suspension points from which to suspend the internal corrosive resistant liner 200, later defined with greater specificity. In addition, across the interior ceiling 32 spanning from one vertical side section interior wall 72 to another, an upper rod suspension means 150 is attached to support and suspend the internal corrosive resistant liner 200 from the interior ceiling 32, FIGS. 8 and 10. The upper and lower eye loops 104, 108, are uniformly placed along the respective upper and lower intersections 103, 107, as disclosed in FIGS. 7 and 9, once again for uniform distribution of forces within the internal cavity 100 of the portable storage tank 10 resulting from the suspension of the internal corrosive resistant liner 200 at full capacity. In addition to the upper rod suspension means 150, a reinforced hem channel 34 is recommended to provide stability to the interior ceiling 32 and roof section 30 from collapse or deformation as the internal corrosive resistant liner 200 is suspended within the internal cavity 100 by the force applied by the internal corrosive resistant liner 200 upon the upper rod suspension means 150.

Figure 11:
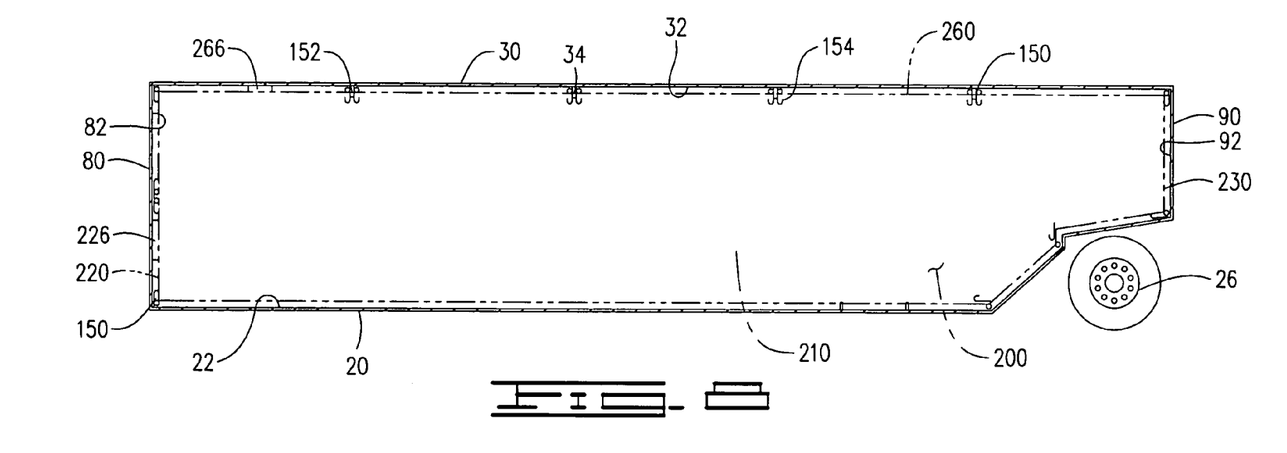
FIG. 11 is an isolation and expanded view of frame 11 as shown in FIG. 7 indicating the lower corner of the internal cavity of the portable storage tank and the snap hook connection between the oarlock along the lower margin of the side panel of the internal corrosive resistant liner and the lower eyeloop.
Figures 11, 12:
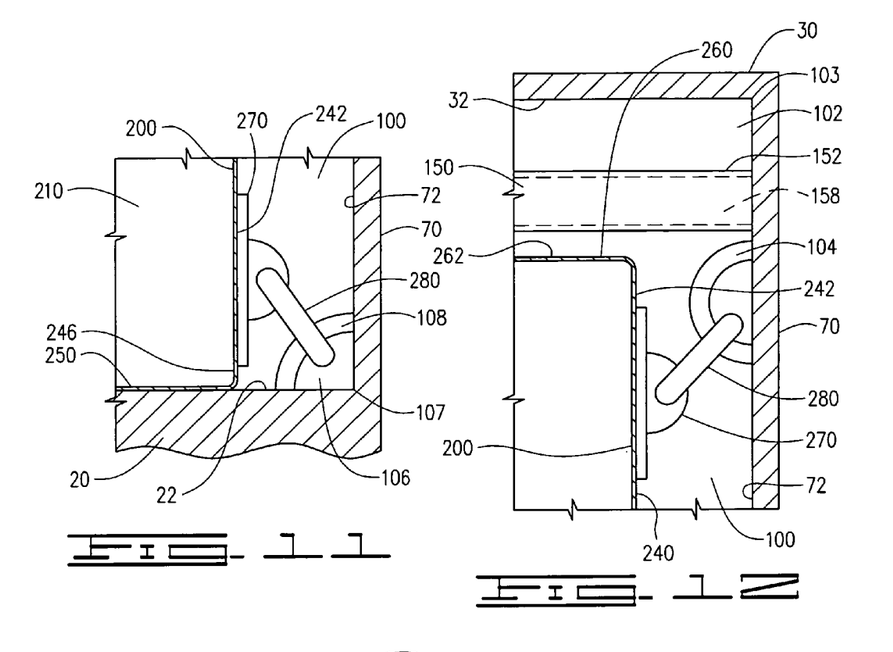
FIG. 12 is an isolation and expanded view of frame 12 as shown in FIG. 7 indicating the upper corner of the internal cavity of the portable storage tank and the snap hook connection between the oarlock along the upper margin of the side panel of the internal corrosive resistant liner and the upper eyeloop.
Figure 12:
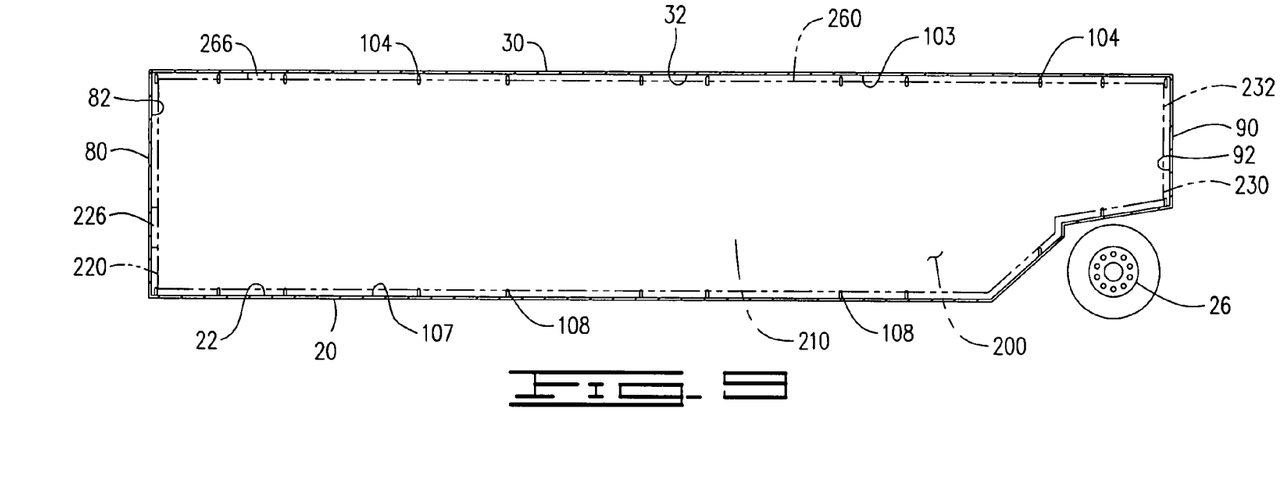
Figure 13:
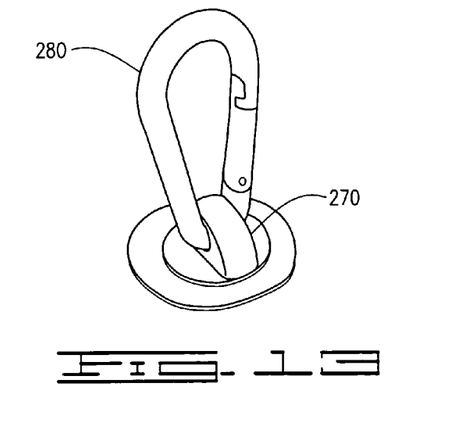
FIG. 13 is a view of an oarlock and the snap hook connection.

The internally suspended corrosive resistant liner 200 further comprises a polyethylene or other strong corrosive resistant material having the physical capacity to avoid reaction with the strong corrosive liquid and to contain the disclosed capacity of liquid without leak or rupture. The liner 200 defines an internal cavity 210 to contain the strong corrosive liquid. Polyethylene within a polymer forming the liner 200 has been found to be resistant to full strength hydrochloric acid, which is one of the strong corrosive liquids intended for containment within the internally suspended corrosive resistant liner 200. The liner 200, FIGS. 2 and 7-12, further defines a front panel 220, rear panel 230, side panels 240, a floor panel 250 and a roof panel 260, which form the internal cavity 210, each also forming a respective exterior surface, 222, 232, 242, 252, and 262. The liner 200 is of a size closely conforming to the interior cavity 100 of the portable storage tank 10, FIGS. 2 and 7-9. A plurality of oarlocks 270 adhere to the exterior surface 242 of the liner 200 along the side panels 240, one set of oarlocks 270 along an upper margin 244 of each side panel 240 and one set of oarlocks 270 vertically below each upper margin placement of oarlocks 270 along a lower margin 246, FIGS. 7 and 11-13. Each oarlock 270 aligns with a respective eye loop 104, 108, the upper set of oarlocks 270 aligning the upper eyeloops 104 and the lower set of oarlocks 270 aligning the lower eyeloops 108, wherein the respectively aligned oarlock 270 and eye loop 104, 108, are connected to one another by a snap hook 280 retaining the liner 200 in full deployment and expansion within the internal cavity 100 of the portable storage tank 10 and ready to be filled with the strong corrosive liquid. FIGS. 7 and 11-12.

The internally suspended corrosive resistant liner 200, FIG. 9, further defines a plurality of pairs of axially aligned suspension panels 264 attached to the exterior surface 262 of the roof panel 260, which align each suspension panel 264 below each upper rod suspension means 150, further attaching the roof panel 260 of the liner 200 through the suspension panels 264 to the interior ceiling 32 of the roof panel 30 of the portable storage tank 10. To accomplish this objective, one embodiment of the upper rod suspension means 150 further comprises a pair of cylindrical tubing brackets 152 axially aligned, spaced apart and attached across from one another at directed suspension points along the upper corners 102, also aligned above the subsequently attached suspension panels 264 on the external surface 262 of the roof panel 260. FIG. 9. This embodiment of the upper rod suspension means 150 further comprises a central curved bracket 154 suspended and centered between each pair of cylindrical tubing brackets 152 and a flexible fiberglass rod 156, the fiberglass rod 156 being inserted through the paired suspension panels 264, with one end 158 of the rod 156 inserted within one of the paired cylindrical tubing brackets 152, the rod 156 being slightly bent while the opposing end 158 of the rod 156 is inserted within the opposite of the paired cylindrical tubing brackets 152 and returned to a straight orientation, the rod 156 being fully extended while held between the paired cylindrical tubing brackets 152. A middle portion 159 of the rod 156 is then raised and attached within the respective central curved bracket 154, thus providing a three point suspension of the rod 156 from the interior ceiling 32 of the roof panel 30, holding the suspension panels 264 above each rod 156 near the interior ceiling 32 of the roof panel 30, FIGS. 7-9.

The upper rod suspension means 150 may also be employed and embodied as vertical and transitional point rod suspension means at a variety of locations within the internal cavity 100 of the portable storage tank 10, as indicated in FIG. 8 of the drawings. This would require placement of these transitional point rod suspension means 150 along the interior wall 92 of the vertical rear section 90, between the interior wall 92 of the rear section 90 and the floor section 20, any angular transition point along the floor surface 22, and/or the vertical front section 80, including between the interior wall 82 of the vertical front section 80 and the floor section 20, as shown in FIG. 8, by the same reference number 150 as the upper rod suspension means. This would include accompanying identical suspension panels on the liner 200 at cooperative points with these additional vertical and transitional point rod suspension means 150, not shown, but identical to those indicated in FIG. 10, except applied to corresponding panels upon the exterior surfaces of the internal corrosion resistant liner 100. It is also recommended that the upper rod suspension means 150 be placed within a spaced close proximity to each hem channel 34 attached to the interior ceiling 32, preferably in pairs in front and behind each hem channel 34, as indicated in FIG. 9, with the central cylindrical curved bracket 154 of each pair facing opposite directions to prevent the fiberglass rods 156 from being displaced during movement or transport of the portable storage tank 10 by motion, stopping or initiating movement forward or reverse.

Figure 1:
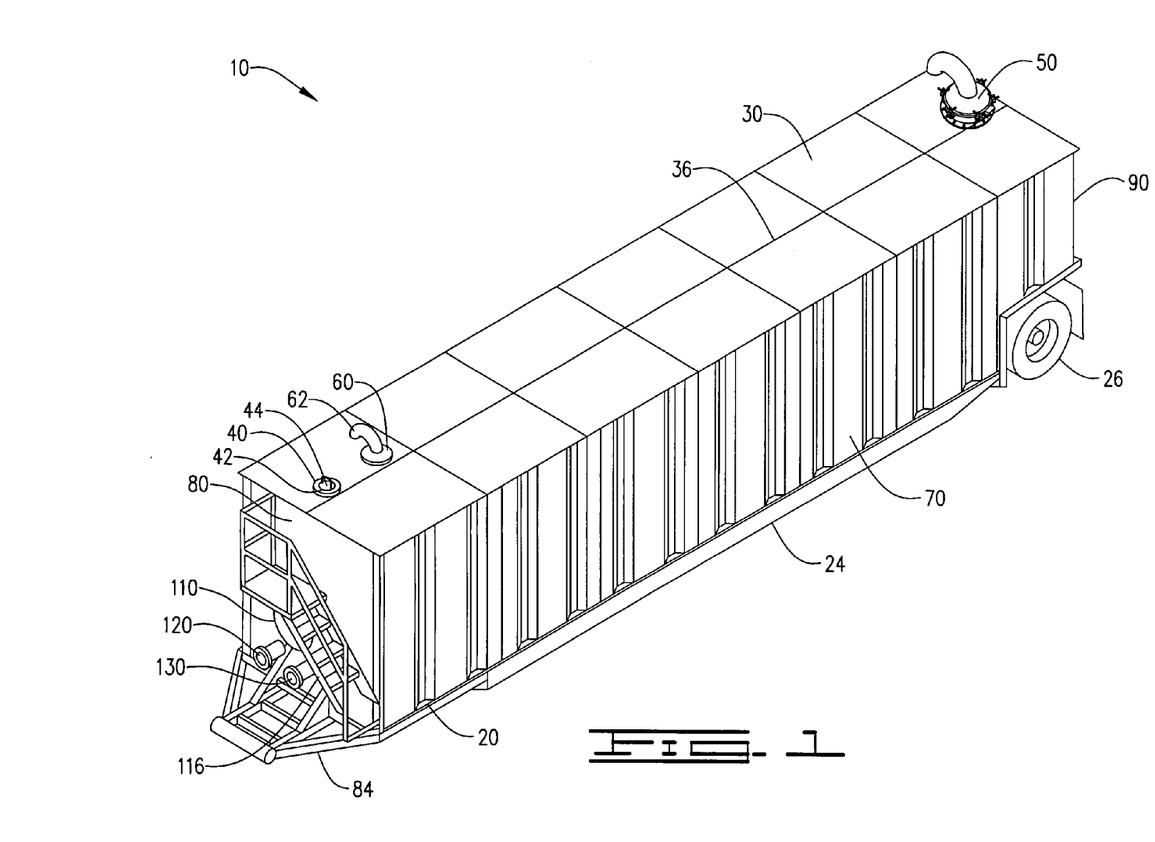
FIG. 1 is an upper perspective view of the portable storage tank.
Figure 2:
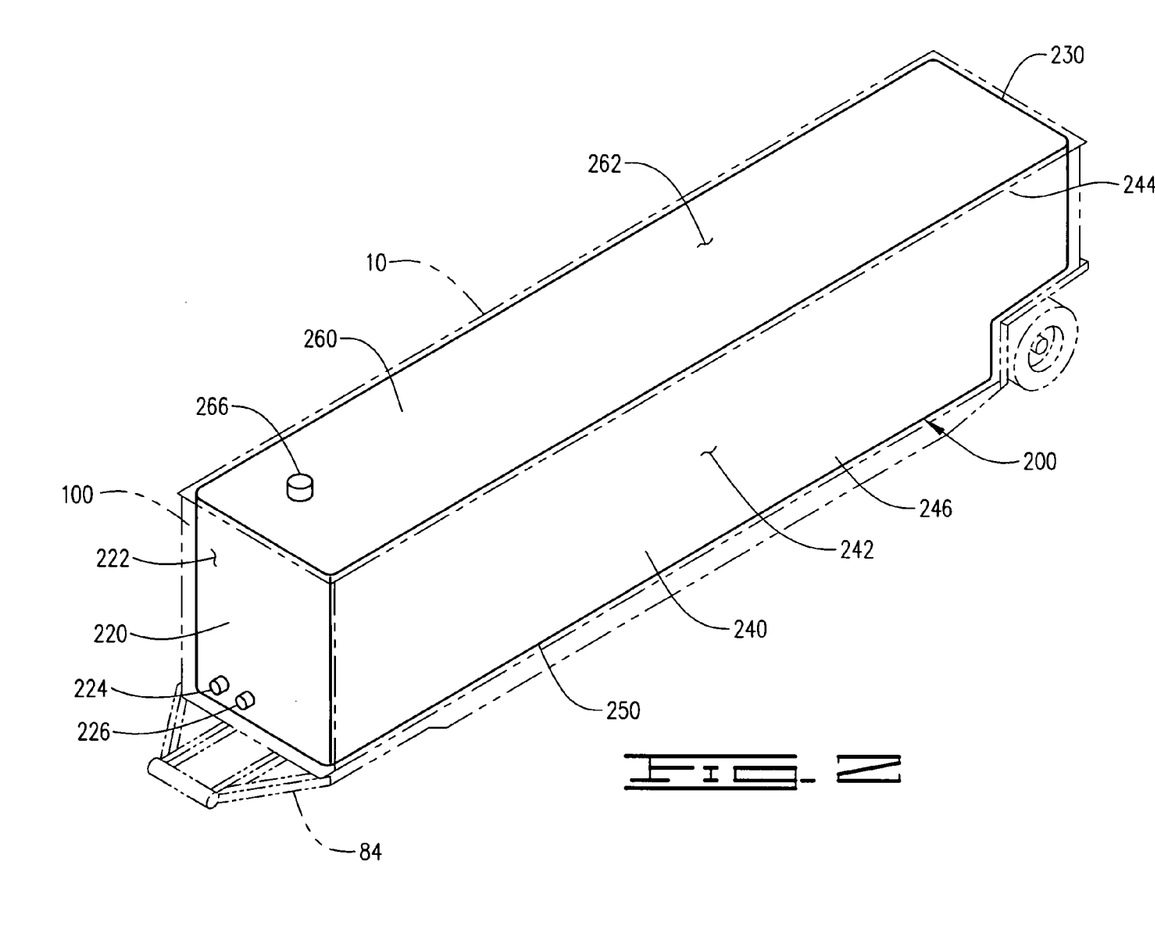
FIG. 2 is an upper perspective view of the internal corrosive resistant liner with phantom lines indicating the portable storage tank.
Figure 3:
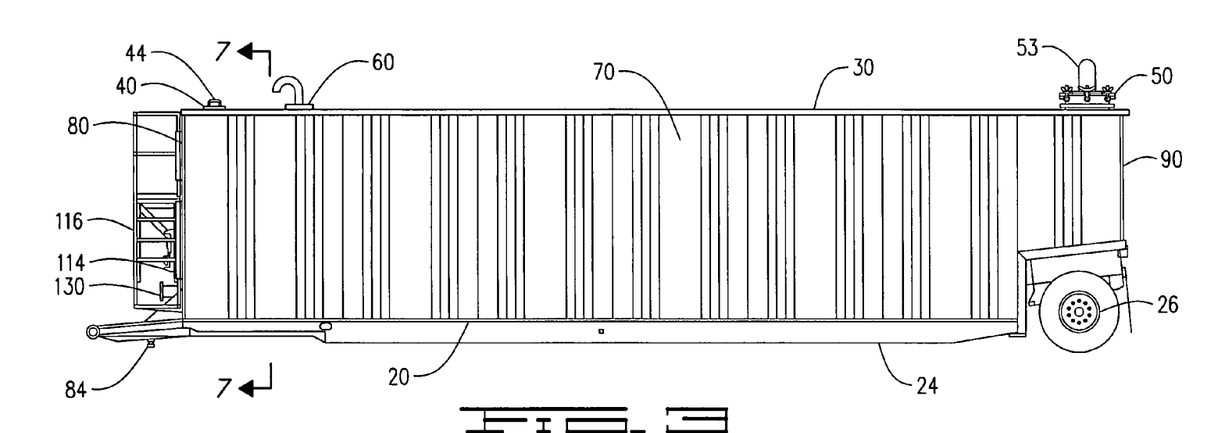
FIG. 3 is a right side view of the portable storage tank.
Figure 4:
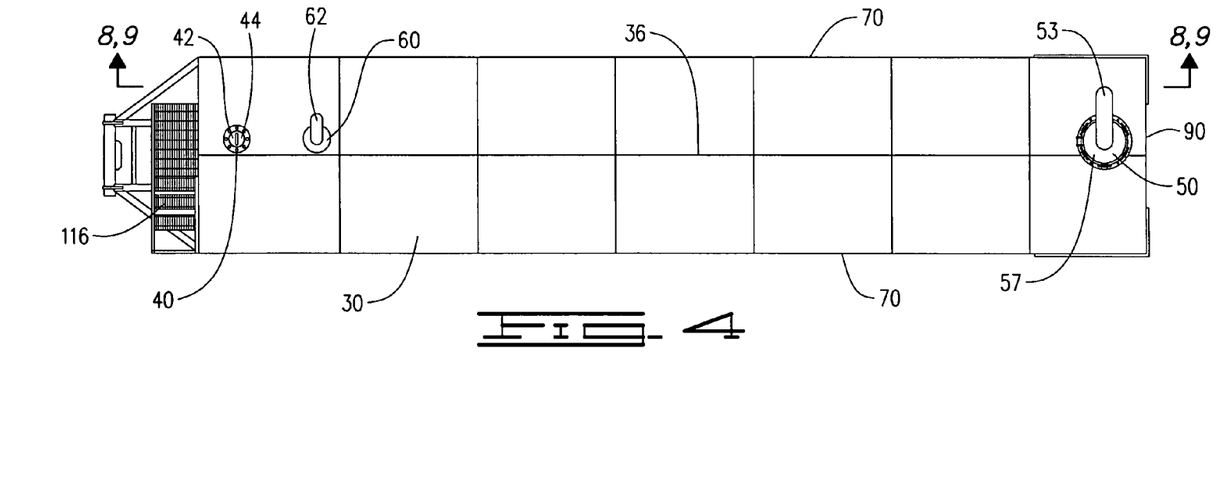
FIG. 4 is a top view of the portable storage tank.
Figure 5:
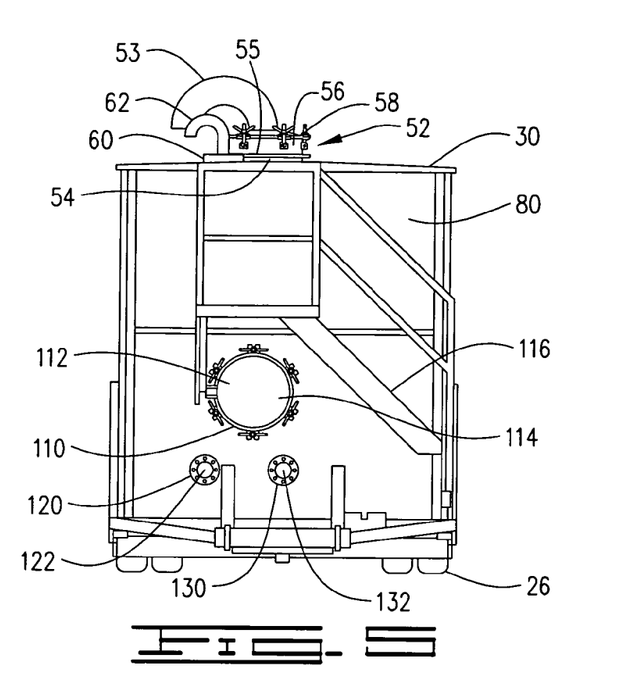
FIG. 5 is a front view of the portable storage tank.
Figure 6:
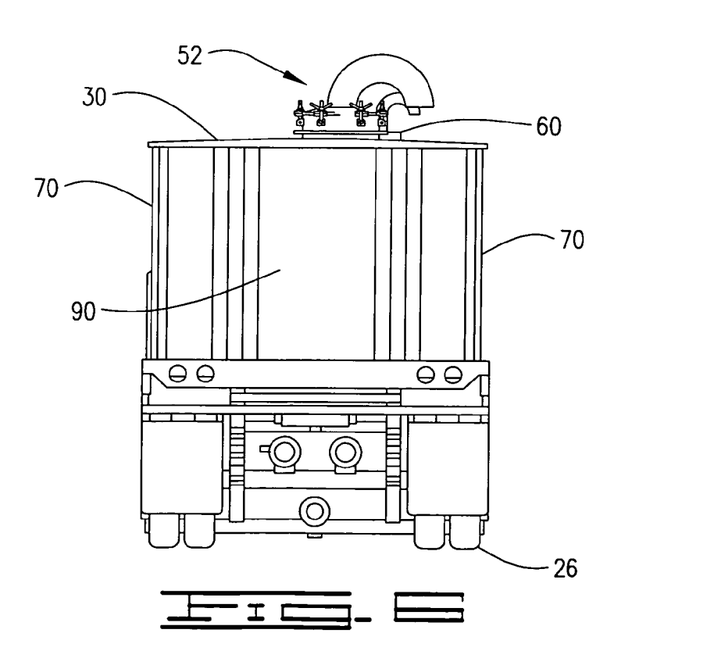
FIG. 6 is a rear view of the portable storage tank.
Figure 14:
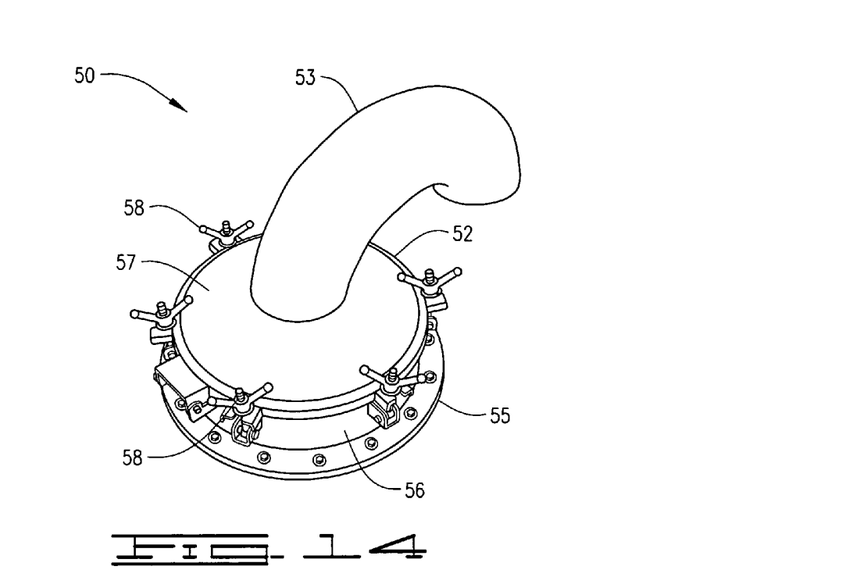
FIG. 14 is an upper perspective view of the upper manway and air vent assembly.
Figure 15:
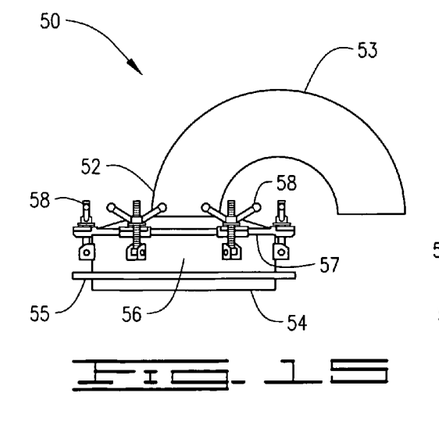
FIG. 15 is a side view of the upper manway and air vent assembly.
Figure 16:
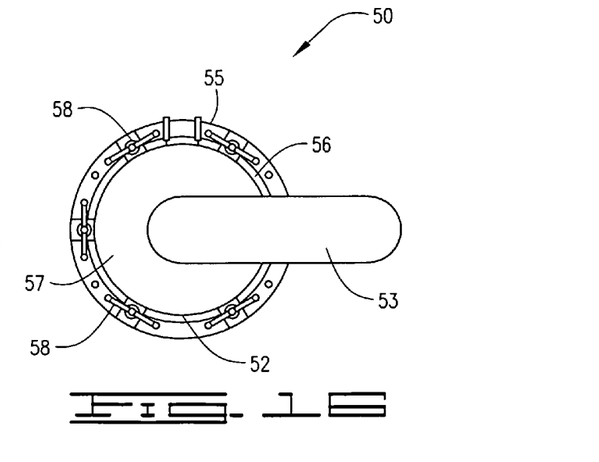
FIG. 16 is an upper view of the upper manway and air vent assembly.

The practical placement of the portable storage tank 10 will be outdoors and subject to the elements. With this consideration, the roof section 30 would most preferably have a slope or crown defined by a longitudinal midline 36, as shown in FIGS. 1 and 4. Also provided within the roof section 30 is an upper manway 50 which provides an air vent assembly 52 placed adjacent to the midline 36 within the roof section 30 providing a curved vent tube 53 towards the rear section 90 to allow air within the liner 200 and the portable storage tank 10 to escape and enter to control the pressure within the portable storage tank 10 and liner 200 as the liquid is placed within the liner 200 and also as the liquid is removed from within the liner 200 and also to provide passage and access by a person to enter the interior cavity 100 of the portable storage tank 10 for application and installation of the liner 200, FIGS. 1 and 14-16. The vent tube 53 is preferable at least an 8" diameter curved tube, as shown in FIGS. 14-16 of the drawings, the vent tube 53 being curved to prevent rain or falling moisture from entering into the portable storage tank 10. The air vent assembly 52 defines a lower base 54 extending through the roof section 30, a flange cap 55 welded or secured to the roof panel 30, a collar 56 extending upwards from the flange cap 55, a lid 57 extending the curved vent tube and securing to the collar 56 by a plurality of closure nuts and bolts 58 to removably secure the lid 57 to the collar 56, FIGS. 14-16.

The roof section 30 may also include a front fill opening 40 to allow for filling of the tank 10 and liner 200 with the corrosive liquid, the front fill opening 40 defining an aperture 42 with a lid 44 engaging the aperture to close the opening, FIGS. 1-4. The liner 200 would also include an upper flange 266 within the roof panel 260 which integrates and engages the front fill opening 40 and provides a direct passage to the internal cavity 210 of the liner 200 for the introduction of the strong corrosive liquid within the internal cavity 210 of the liner 200, FIGS. 2 and 7-9. The roof section 30 may further include a secondary vent aperture 60 to further provide air pressure regulation within the storage tank 10, but at a secondary location towards the front section 80 of the roof section 30, close to or within proximity of the front fill opening 40, again extending a curved vent tube 62 to prevent falling moisture from entry into the storage tank 10, FIG. 1-4.

The vertical front section 80 of the portable storage tank 10 further comprises the towing hitch 84, a lower front dispensing outlet 120, a lower front fill inlet 130 and a primary manway 110. The lower front dispensing outlet 120 provides a valve 122 connecting to a front dispensing flange 224 integrated within the front panel 220 of the liner 200, the front dispensing flange removable sealing within the lower front dispensing outlet 120, FIGS. 1-2 and 5. The lower front fill inlet 130 also provides a valve 132 connecting to a front fill flange 226 integrated within the front panel 220 of the liner 200, the front fill flange 226 removably sealing within the lower front fill inlet 130. The primary manway 110 provides a large opening 112 in the vertical front section 80 of the portable storage tank 10 allowing a person access to the interior cavity 100 of the portable storage tank 10 during installation and removal of the liner 200 within the portable storage tank 10, FIG. 5. The large opening 112 of the manway is closed by a manway hatch 114 sealable engaging the opening 112. As an option, a stairway 116 may also be attached to the front surface 80 to provide access to the roof section 30 of the portable storage tank 10 to perform maintenance, to access the upper manway 50, and to gain access to the front fill opening 40 as an option to fill the liner 200 with the strong corrosive liquid.

It should be noted that at full capacity, the portable storage tank 10 and the internal corrosive resistant liner 200 would weight a great deal. It should also be noted that the internal corrosive resistant liner, when filled, will apply a great deal of anticipated outward force against the floor panel 250, the side panels 240, the front panel 220 and the rear panel 230. Thus it can be ascertained that the liner 200 composition be capable of withstanding this applied force without tearing, leaking or rupture. It should also be ascertained that in order to support weight of the liner 200 and its liquid contents, the portable storage tank 10 would also need to be sufficient to support these downward and outward forces. It is therefore anticipated that the floor section 20, roof section 30, vertical front section 80, vertical rear section 90 and vertical side sections 70 be provided with reinforcement means, other than those already disclosed, that would withstand a much greater amount of force than would be anticipated as a stationary storage tank to compensate for motion during transport, filling and other movement forces in addition to those static forces anticipated by the portable storage tank 10 and suspended internal corrosive resistant liner 200. The drawing indicate certain reinforcement features that are not contained within the claims, but merely illustrate the presence of these necessary reinforcements, but do not actually define them in a specific embodiment.

The portable storage tank 10 is most preferably made of steel welded together. It is contemplated that other metals may be used, but the selection of the metals should be capable of performing the physical containment of the liquids and stress forces applied by the internally suspended corrosive resistant liner 200. The internal cavity 100 may be coated with a secondary chemical coating to provide further resistance to corrosion of the portable storage tank 10. Steel is a practical selection due to its low cost, ease of manufacture, structural integrity and availability.

The internal corrosive resistant liner 200 is earlier stated as being made of polyethylene or other strong corrosive resistant material. Depending on the content, the liner 200 may be made of an appropriate material based upon the specific content intended for containment. Although making reference to polyethylene because of its resistant properties to hydrochloric acid, the liner 200 may be made of a single ply material or a dual laminate material, and the material may be a fiberglass reinforced plastic, glass reinforced plastic, PP, PVC, PTFE, ECTFE, ETFE, FEP, CPVC or PVDF. Most importantly, the liner 200 must be of a material to not only resist the corrosiveness of the liquid, but it must also be able to withstand the hydrostatic forces and provide the hoop strength applied by the pressure of the liner at full capacity, by pressure of vacuum, seismic loads and fluid sloshing and fluid movement during filling and dispensing. Any bonding of the liner during construction must be sufficient to prevent tearing as a seam and thermoplastic bonding integrity would be a vital consideration. Axial stress, hoop stress and breaking stress area also concerns which deserve consideration as related to stress and strain in the selection of the appropriate liner and its construction. However, that is better suited for other patent considerations, but deserve some consideration in choice of materials in the present liner to expand the consideration set forth within this specification and subsequent claimed subject matter. For purposes of definition, the liner 200 would consider every possible chemical consideration in the known art for containing the corrosive liquid to be contained within the liner 200 and portable storage tank 10.

The portable storage tank 10 and the internal corrosive resistant liner 200 are identified by purpose as being used to contain the corrosive liquid within the liner 200 at an ambient atmospheric pressure using a gravity flow for filling and dispensing the liquid. The air vent assembly 52 and secondary vent aperture 60 are intended to regulate the pressure inside the portable storage tank 10 and liner 200 to that equal to or near equal to the outside air pressure by releasing air from the portable storage tank and liner and also by allowing air to enter the portable storage tank and liner, thus regulating and stabilizing the potential change in atmospheric pressure and also the pressure caused by the gain or loss of fluid from within the liner, FIGS. 14-16. It is contemplated although not disclosed or shown that the air vent assembly 52 and secondary vent aperture 60 may contain passive or active air regulatory valves to assist in the regulation of air pressure within the portable storage tank 10 and liner 200.

As to the liquid corrosives that may be contained within the scope of this portable storage tank 10 and internal corrosive resistant liner 200, these chemicals include strong acids, including hydrochloric, sulfuric and phosphoric acid, strong bases, including hydroxides of sodium, potassium and ammonia, strong dehydrating corrosives, including sulfuric phosphorous pentoxide and calcium oxide, and strong oxidizing corrosives, including hydrogen peroxide and sodium hypochlorite.

Because of the hazardous nature of the material liquids, great caution should be exercised in using this product. Filling and dispensing should only be performed by trained professionals with training in corrosive chemicals. The tank 10, by being portable, should properly be filled at a professional dispensary and hauled to the use site, which is why the portable storage tank and liner are indeed portable. It is also highly recommended that the liner 200 within the portable storage tank 10 is tested and pre-fitted by the liner manufacturer to ensure proper installation, which would require a systemic method for installing the liner 200 from within the portable storage tank 10 from one end to another due to the multiple suspension points connecting each upper rod suspension means 150 in an intentional sequence, further connecting each upper and lower eye loops 104, 108, to each respective oarlock 270 by each respective snap hook 280 and further attaching the upper flange 266 to the front fill opening 40, the front dispensing flange 224 to the lower front dispensing outlet 120 and the front fill flange 226 to the lower front fill inlet 130. These are likely not installed randomly, but by a sequence determined by best mode using a method not contained within this specification or claims.

While the portable storage tank 10 and internally suspended corrosive resistant liner 200 have been particularly shown and described with reference to a preferred embodiment thereof, it will be understood by those skilled in the art that changes in form and detail may be made therein without departing from the spirit and scope of the invention.

What is claimed is:

1. A portable storage tank and internal corrosive resistant liner for containment and dispensing of a strong corrosive liquid at a remote location, comprising:

said portable storage tank providing a floor section, a roof section, a pair of side sections, a front section and a rear section defining an internal cavity, said internal cavity further defining upper corners attaching a plurality of upper eyeloops and lower corners defining lower eyeloops and said roof section further defining an interior ceiling;

said internal corrosive resistant liner providing a floor panel, a roof panel, a pair of side panels, a front panel and a rear panel defining an internal cavity, each panel further defining an exterior surface;

a plurality of upper rod suspension means suspending said roof panel of said internal corrosive resistant liner from said interior ceiling of said portable storage tank through a plurality of paired upper suspension panels attached to said exterior surface of said roof panel at a plurality of locations along said roof panel;

a plurality of oarlocks attaching to each said side panel along an upper margin and a lower margin of each said side panel, corresponding in proximity to each said upper and lower eyeloop of said portable storage tank as said internal corrosive resistant liner is suspended from within said internal cavity of said portable storage tank by attachment of a snap hook connecting each said eyeloop to each said proximal oarlock;

a manway having an opening with a hatch providing access through said front panel of said portable storage tank providing access into said internal cavity of said portable storage tank; and at least one dispensing outlet in said front panel of said portable storage tank cooperating with at least one dispensing flange within said internal corrosive resistant liner providing passage from said internal cavity of said liner through said front panel of said portable storage tank to dispense said strong corrosive liquid from said storage tank and at least one fill inlet in said front panel of said portable storage tank cooperating with at least one fill flange within said internal corrosive resistant liner providing passage from said internal cavity of said liner through said front panel of said portable storage tank to introduce said strong corrosive liquid into said portable storage tank, wherein said liner may be repeatedly filled and dispensed, said portable storage tank may be transported empty or filled and said liner may be replaced within said portable storage tank for continued use of said portable storage tank.

2. The portable storage tank and internal corrosive resistant liner as disclosed in claim 1 further comprising said portable storage tank and internal corrosive resistant liner are a symmetrical shape wherein a suspension forces are uniformly distributed and balanced while empty or at full capacity.

3. The portable storage tank and internal corrosive resistant liner as disclosed in claim 1 further comprising said interior ceiling of said roof section provides a reinforced hem channel across said roof panel at each location where said upper rod suspension means is provided to provide additional stability to said roof panel from suspension forces exerted by said corrosive resistant liner.

4. The portable storage tank and internal corrosive resistant liner as disclosed in claim 1 said corrosive resistant liner correlating with the strong corrosive liquid to be contained within said internal corrosive resistant liner selected from a list of materials consisting of:

polyethylene, a fiberglass reinforced plastic, glass reinforced plastic, PP, PVC, PTFE, ECTFE, ETFE, FEP, CPVC or PVDF, and having the physical properties which withstand hydrostatic forces and providing hoop strength applied by the pressure of the liner at full capacity, by pressure of vacuum, seismic loads and fluid sloshing and fluid movement during filling and dispensing.

5. The portable storage tank and internal corrosive resistant liner as disclosed in claim 1, said upper rod suspension means further comprising:

a plurality of paired axially aligned cylindrical tubing brackets attached across from one another at along said upper corners, also aligned above said attached paired suspension panels, also axially aligned on said external surface of said roof panel;

a central curved bracket suspended and centered between each said pair of cylindrical tubing brackets; and a flexible fiberglass rod inserted through each said paired suspension panels, with one end of said rod within one of each said paired cylindrical tubing brackets, said rod being slightly bent during installation as an opposing end of said rod is inserted within said opposite paired cylindrical tubing brackets and returned to a straight orientation, said rod fully extended during retention within said paired cylindrical tubing brackets, said rod further defining a middle portion, raised and attached within said respective central curved bracket, providing a three point suspension of said rod from said interior ceiling of said roof panel, holding said paired suspension panels above each said rod near said interior ceiling of said roof panel.

6. The portable storage tank and internal corrosive resistant liner as disclosed in claim 1 further comprising:

said upper rod suspension means is duplicated and employed as vertical panel and transitional point rod suspension means at location other than said interior ceiling of said roof panel, including but not limited to an interior wall of a vertical rear section, between said interior wall of said rear section and said floor section, any angular transition point along said floor surface, and/or said vertical front section, including between said interior wall of a vertical front section and said floor section; and accompanying identical paired suspension panels on said liner at cooperative points as each said vertical panel and transitional point rod suspension means upon said front panel, said rear panel or said floor panel panels upon said exterior surfaces of said internal corrosion resistant liner.

7. The portable storage tank and internal corrosive resistant liner as disclosed in claim 1, said roof panel further comprising:

a longitudinal midline;

an upper manway providing an integrated air vent assembly placed adjacent to said midline extending a curved vent tube towards said rear section to allow air from said internal cavity of said internal corrosive resistant liner and said internal cavity of said portable storage tank to escape and enter to regulate pressure as said strong corrosive liquid is introduced and withdrawn, said manway further providing passage and access by a person into said interior cavity of said portable storage tank for application and installation of said internal corrosive resistant liner.

8. The portable storage tank and internal corrosive resistant liner as disclosed in claim 1, said roof panel further comprising:

a front fill opening to fill said internal corrosive resistant liner with said strong corrosive liquid, said front fill opening defining an aperture with a lid engaging said aperture to close the opening; and an upper flange extending from said roof panel integrating with and engaging said front fill opening and providing direct passage to said internal cavity of said internal corrosive resistant liner for introduction of said strong corrosive liquid within the internal cavity.

9. The portable storage tank and internal corrosive resistant liner as disclosed in claim 1 further comprising:
   an upper manway providing an integrated air vent assembly placed adjacent to said midline extending a curved vent tube towards said rear section to allow air from said internal cavity of said internal corrosive resistant liner and said internal cavity of said portable storage tank to escape and enter to regulate pressure as said strong corrosive liquid is introduced and withdrawn, said manway further providing passage and access by a person into said interior cavity of said portable storage tank for application and installation of said internal corrosive resistant liner, said air vent assembly further defining a lower base extending through said roof section, a flange cap secured to said lower base, a collar extending upward from said flange cap, a lid extending said curved vent tube and securing to said collar by a plurality of closure nuts and bolts, removably securing said lid to said collar, and
   a secondary vent aperture further providing air pressure regulation within said portable storage tank at a secondary location close to or within proximity of a front fill opening in said portable storage tank, said secondary vent aperture extending a curved vent tube.

10. The portable storage tank and internal corrosive resistant liner as disclosed in claim 1, said front panel further comprising:
    a stairway attached to said exterior surface of said front panel to gain access to said roof panel;
    a tow hitch attaching to a floor frame of said portable storage tank; and
    rear wheels attached to said frame to provide towing transport to said portable storage tank by a towing vehicle.

11. A portable storage tank and internal corrosive resistant liner for containment and dispensing of a strong corrosive liquid at a remote location, comprising:
    said portable storage tank providing a floor section, a roof section defining a longitudinal midline, a pair of side sections, a front section and a rear section defining an internal cavity, said internal cavity further defining upper corners attaching a plurality of upper eyeloops and lower corners defining lower eyeloops and said roof section further defining an interior ceiling;
    said internal corrosive resistant liner providing a floor panel, a roof panel, a pair of side panels, a front panel and a rear panel defining an internal cavity, each panel further defining an exterior surface;
    an upper manway providing an integrated an air vent assembly placed adjacent to said midline extending a curved vent tube towards said rear section to allow air from said internal cavity of said internal corrosive resistant liner and said internal cavity of said portable storage tank to escape and enter to regulate pressure as said strong corrosive liquid is introduced and withdrawn, said manway further providing passage and access by a person into said interior cavity of said portable storage tank for application and installation of said internal corrosive resistant liner;
    a plurality of upper rod suspension means suspending said roof panel of said internal corrosive resistant liner from said interior ceiling of said portable storage tank through a plurality of paired upper suspension panels attached to said exterior surface of said roof panel at a plurality of locations along said roof panel;
    a plurality of oarlocks attaching to each said side panel along an upper margin and a lower margin of each said side panel, corresponding in proximity to each said upper and lower eyeloop of said portable storage tank as said internal corrosive resistant liner is suspended from within said internal cavity of said portable storage tank by attachment of a snap hook connecting each said eyeloop to each said proximal oarlock;
    a manway having an opening with a hatch providing access through said front panel of said portable storage tank providing access into said internal cavity of said portable storage tank; and
    at least one dispensing outlet in said front panel of said portable storage tank cooperating with at least one dispensing flange within said internal corrosive resistant liner providing passage from said internal cavity of said liner through said front panel of said portable storage tank to dispense said strong corrosive from said storage tank and at least one fill inlet in said front panel of said portable storage tank cooperating with at least one fill flange within said internal corrosive resistant liner providing passage from said internal cavity of said liner through said front panel of said portable storage tank to introduce said strong corrosive into said portable storage tank, wherein said liner may be repeatedly filled and dispensed, said portable storage tank may be transported empty or filled and said liner may be replaced within said portable storage tank for continued use of said portable storage tank.

12. The portable storage tank and internal corrosive resistant liner as disclosed in claim 11 further comprising said portable storage tank and internal corrosive resistant liner are a symmetrical shape wherein a suspension forces are uniformly distributed and balanced while empty or at full capacity.

13. The portable storage tank and internal corrosive resistant liner as disclosed in claim 11 further comprising said interior ceiling of said roof section provides a reinforced hem channel across said roof panel at each location where said upper rod suspension means is provided to provide additional stability to said roof panel from suspension forces exerted by said corrosive resistant liner.

14. The portable storage tank and internal corrosive resistant liner as disclosed in claim 11 said corrosive resistant liner correlating with the strong corrosive liquid to be contained within said internal corrosive resistant liner selected from a list of materials consisting of:
    polyethylene, a fiberglass reinforced plastic, glass reinforced plastic, PP, PVC, PTFE, ECTFE, ETFE, FEP, CPVC or PVDF, and having the physical properties which withstand hydrostatic forces and providing hoop strength applied by the pressure of the liner at full capacity, by pressure of vacuum, seismic loads and fluid sloshing and fluid movement during filling and dispensing.

15. The portable storage tank and internal corrosive resistant liner as disclosed in claim 11, said upper rod suspension means further comprising:
    a plurality of paired axially aligned cylindrical tubing brackets attached across from one another at along said upper corners, also aligned above said attached paired suspension panels, also axially aligned on said external surface of said roof panel;
    a central curved bracket suspended and centered between each said pair of cylindrical tubing brackets; and a flexible fiberglass rod inserted through each said paired suspension panels, with one end of said rod within one of each said paired cylindrical tubing brackets, said rod being slightly bent during installation as an opposing end of said rod is inserted within said opposite paired cylindrical tubing brackets and returned to a straight orientation, said rod fully extended during retention within said paired cylindrical tubing brackets, said rod further defining a middle portion, raised and attached within said respective central curved bracket, providing a three point suspension of said rod from said interior ceiling of said roof panel, holding said paired suspension panels above each said rod near said interior ceiling of said roof panel.

16. The portable storage tank and internal corrosive resistant liner as disclosed in claim 11 further comprising:

said upper rod suspension means is duplicated and employed as vertical panel and transitional point rod suspension means at location other than said interior ceiling of said roof panel, including but not limited to an interior wall of a vertical rear section, between said interior wall of said rear section and said floor section, any angular transition point along said floor surface, and/or said vertical front section, including between said interior wall of a vertical front section and said floor section; and accompanying identical paired suspension panels on said liner at cooperative points as each said vertical panel and transitional point rod suspension means upon said front panel, said rear panel or said floor panel panels upon said exterior surfaces of said internal corrosion resistant liner.

17. The portable storage tank and internal corrosive resistant liner as disclosed in claim 11, said roof panel further comprising:

a front fill opening to fill said internal corrosive resistant liner with said strong corrosive liquid, said front fill opening defining an aperture with a lid engaging said aperture to close the opening; and an upper flange extending from said roof panel integrating with and engaging said front fill opening and providing direct passage to said internal cavity of said internal corrosive resistant liner for introduction of said strong corrosive liquid within the internal cavity.

18. The portable storage tank and internal corrosive resistant liner as disclosed in claim 11 further comprising:

an upper manway providing an integrated air vent assembly placed adjacent to said midline extending a curved vent tube towards said rear section to allow air from said internal cavity of said internal corrosive resistant liner and said internal cavity of said portable storage tank to escape and enter to regulate pressure as said strong corrosive liquid is introduced and withdrawn, said manway further providing passage and access by a person into said interior cavity of said portable storage tank for application and installation of said internal corrosive resistant liner, said air vent assembly further defining a lower base extending through said roof section, a flange cap secured to said lower base, a collar extending upward from said flange cap, a lid extending said curved vent tube and securing to said collar by a plurality of closure nuts and bolts, removably securing said lid to said collar, and a secondary vent aperture further providing air pressure regulation within said portable storage tank at a secondary location close to or within proximity of a front fill opening in said portable storage tank, said secondary vent aperture extending a curved vent tube.

19. The portable storage tank and internal corrosive resistant liner as disclosed in claim 11, said front panel further comprising:

a stairway attached to said exterior surface of said front panel to gain access to said roof panel;

a tow hitch attaching to a floor frame of said portable storage tank; and rear wheels attached to said frame to provide towing transport to said portable storage tank by a towing vehicle.

* * * * *